US006990606B2

(12) United States Patent (10) Patent No.: US 6,990,606 B2
Schroiff et al. (45) Date of Patent: Jan. 24, 2006

(54) CASCADING FAILOVER OF A DATA MANAGEMENT APPLICATION FOR SHARED DISK FILE SYSTEMS IN LOOSELY COUPLED NODE CLUSTERS

(75) Inventors: Klaus Schroiff, Stolberg (DE); Peter Gemsjaeger, Stromberg (DE); Christian Bolik, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 09/883,113

(22) Filed: Jun. 15, 2001

(65) Prior Publication Data

US 2002/0073354 A1 Jun. 13, 2002

(30) Foreign Application Priority Data

Jul. 28, 2000 (DE) ................. 001 16 453

(51) Int. Cl.
*G06F 11/00* (2006.01)
(52) U.S. Cl. .................. 714/7; 714/6; 714/4
(58) Field of Classification Search .......... 714/4, 714/6, 7
See application file for complete search history.

(56) References Cited

U.S. PATENT DOCUMENTS

| 5,561,759 A | * | 10/1996 | Chen ............... 714/4 |
| 5,926,619 A | * | 7/1999 | Badovinatz et al. ...... 714/4 |
| 6,012,150 A | | 1/2000 | Bartfai et al. .......... 714/4 |
| 6,360,331 B2 | * | 3/2002 | Vert et al. ............ 714/4 |

FOREIGN PATENT DOCUMENTS

| EP | 0 478 291 A2 | 4/1992 |
| EP | 0 478 291 A3 | 4/1992 |
| EP | 0 981 089 A2 | 2/2000 |
| EP | 0 981 089 A3 | 6/2000 |
| GB | 2 287 559 | 9/1995 |
| JP | 07-064811 | 3/1995 |
| JP | 07-334468 | 12/1995 |
| JP | 11-184825 | 7/1999 |

OTHER PUBLICATIONS

"Data Management API: the standard and implementation experiences," Alex Miroschnichenko, AUUG, 1996.

* cited by examiner

*Primary Examiner*—Scott Baderman
*Assistant Examiner*—Joshua Lohn
(74) *Attorney, Agent, or Firm*—Bryan W. Butler; Harrington & Smith, LLP

(57) ABSTRACT

Disclosed is a mechanism for handling failover of a data management application for a shared disk file system in a distributed computing environment having a cluster of loosely coupled nodes which provide services. According to the mechanism, certain nodes of the cluster are defined as failover candidate nodes. Configuration information for all the failover candidate nodes is stored preferably in a central storage. Message information including but not limited to failure information of at least one failover candidate node is distributed amongst the failover candidate nodes. By analyzing the distributed message information and the stored configuration information it is determined whether to take over the service of a failure node by a failover candidate node or not. After a take-over of a service by a failover candidate node the configuration information is updated in the central storage.

10 Claims, 6 Drawing Sheets

CASCADING FAILOVER OF A DATA MANAGEMENT APPLICATION FOR SHARED DISK FILE SYSTEMS IN LOOSELY COUPLED NODE CLUSTERS

BACKGROUND OF THE INVENTION

The present invention pertains to the field of managing information shared among data storage resources distributed in a clustered information technology environment and more specifically to a method and system for handling failover recovery of data management of a shared disk file system used in such a loosely coupled node cluster.

Enterprises with large or networked computing environments often employ distributed file systems. In recent years, the need to store high-resolution images, scientific data, etc., has created a serious imbalance between data input/output (I/O) and storage system performance and functionality. Thus the performance and capacity of current mass storage systems must improve by orders of magnitude.

To provide cost-effective access to data in such storage-intensive computing environments, mass storage systems must be integrated with the underlying distributed file systems. Thereupon, coupling mass storage systems with these file systems, provides a seamless view of the file system.

The ever-increasing demand for data storage capacity implies costs associated with managing the distributed storage system which have been significantly higher than the costs of the storage itself. Thus there is an ongoing need for intelligent and efficient storage management by way of a Data Management (DM) application.

The DM application migrates the data between a fast on-line storage of limited storage capacity and a tertiary storage archive. In addition, it provides on-line semantics for all the data stored in the tertiary archive, i.e. the users don't need to perform any administrative operations in order to access the data. Moreover, the DM Application recognizes any access to the archived data and automatically transfers the data to the user. For that reason, some monitoring facilities must be provided so that the DM application may need to be notified when a user attempts to read a block of data from a data file.

The predescribed concept, namely to free local storage space by migrating data to a remote storage device, is commonly known as Hierarchical Storage Management (HSM). The storage management is transparent to the user i.e. he still has the view as if the data are local.

In a file-based HSM the DM application generates so-called "stub files" as placeholders which just keep the file attributes. When accessing the stub files, or the correspondingly punched disk region(s), the data of the file (or a disk region) is recalled from the remote storage device again. Typically HSM is installed on a file server storing a large number of rarely accessed data (e.g. archived weather maps, video presentations).

It is further known that the availability of a predescribed distributed mass storage system, i.e. the availability of the combination of the underlying data storage devices and DM application(s) can be improved if a part of the storage system can take over services of a failure storage system, usually designated as "failover".

Thereupon, file systems are known which manage the sharing of disks across multiple host machines such as the General Parallel File System (GPFS) running on AIX SP (UNIX-based Scalable Power Parallel Computer) developed and sold by the present applicant. In order to allow DM applications to be developed much like ordinary software applications, a Data Management Application Interface (DMApi) (specified by the Data Management Interfaces Group (DMIG) consortium) has been proposed which is implemented by the file system and used by a Data Management (DM) Application to perform the following functions:

Hierarchical Storage Management (HSM)

Data backup and restore

The DMApi is targeted to provide an environment which is suitable for implementing robust, commercial-grade DM applications. In a shared disk environment the DMApi can particularly include facilities for DM application crash recovery and stateful control of the file system objects.

In a cluster of loosely coupled computer nodes, which is particularly addressed by the present invention, each node comprises a DM application providing storage management support which requires so-called "DMApi events" which can be synchronous or asynchronous. DMApi events are mechanisms that allow a DM application to be notified whenever certain operations occur in an underlying operating system implemented on a certain node of the cluster. By these mechanisms DMApi sessions can be taken over by another node which generates a single point of failure. The DMApi sessions are the primary communication channels between a DM application and a Kernel component of the DMApi implemented in the underlying operating system.

In a classic one-node/computer environment file system services would end in case of a system failure. In a cluster environment it is most likely that a single node failure does not effect other (independent) nodes within the system. If the DM Application resides on the failure node, the access to stubbed files gets unavailable which potentially interrupts running processes on active cluster nodes. Therefore it is desirable to migrate the DM application to an active cluster node recovering the HSM functionality in order to leave other cluster nodes unaffected by the initial node failure.

SUMMARY OF THE INVENTION

An object of the present invention therefore is to provide a method and a system for handling failover of a data management application for a shared disk file system in a distributed computing environment.

A further object is to provide such a method and system for handling failover in a distributed computing environment having a cluster of loosely coupled nodes which provide data access services.

Another object is to provide such a method and system which allow for failover handling of a DMApi based HSM application in such a clustered environment.

These objects are solved by the features of the independent claims. Advantageous embodiments of the invention are subject matter of the dependent claims.

The method according to the invention accomplishes the foregoing by the steps of defining certain nodes of the cluster as failover candidate nodes, storing configuration information for all the failover candidate nodes, distributing message information including but not limited to failure information of at least one failover candidate node amongst the failover candidate nodes, analyzing the distributed message information and the stored configuration information in order to determine whether to take over the service of a failure node by a failover candidate node or not, and updating the configuration information in case of at least one failover candidate node taking over the service of a failure node.

In general, there are two failure types in a cluster environment. A first type is that one node recognizes that it is no longer able to provide data access services and therefore has to trigger a failover request in order to recover the data access service on a different node. In case of a total failure of one node, the cluster service distributes failure events to the failover candidate nodes. The invention addresses both types of failures and provides only one mechanism.

The particular concept underlying the present invention is to provide a mechanism in conjunction with a file system which allow a DMApi session to be moved upon failure thus enabling cascaded failover of a DM application. That mechanism provides higher levels of availability to the user(s) of the distributed mass storage system in a unique way.

Loosely coupled systems are characterized by a pronounced independence of the cluster nodes which is caused by the lack of shared main memory (RAM). The cluster functionality is based on some sort of high-speed interconnection on the hardware side and a cluster software that provides functions such as node-to-node communication and shared data storage.

Compared to a monolithic (multi-processor) system there are two problems regarding the synchronization between loosely coupled cluster nodes:

the lack of a synchronized locking mechanism similar to system mutexes the loss of local configuration information on a failure node.

The present invention overcomes these problems by simulating this functionality using secondary storage and an alternative object locking mechanism.

In addition, the invention advantageously provides an access-guarantee to stubbed files.

In a preferred embodiment of the invention a failover request is carried on to at least a second failover candidate if only a subset of the filesystem is taken over from the failure node by a first failover candidate. That cascading mechanism considerably enhances the robustness of failure recovery in a loosely coupled computer environment.

BRIEF DESCRIPTION OF THE DRAWINGS

The invention will be understood more readily from the following detailed description when taken in conjunction with the accompanying drawings, from which further features and advantages of the invention will become apparent. In the drawings

DETAILED DESCRIPTION OF THE DRAWINGS

Figure 1:
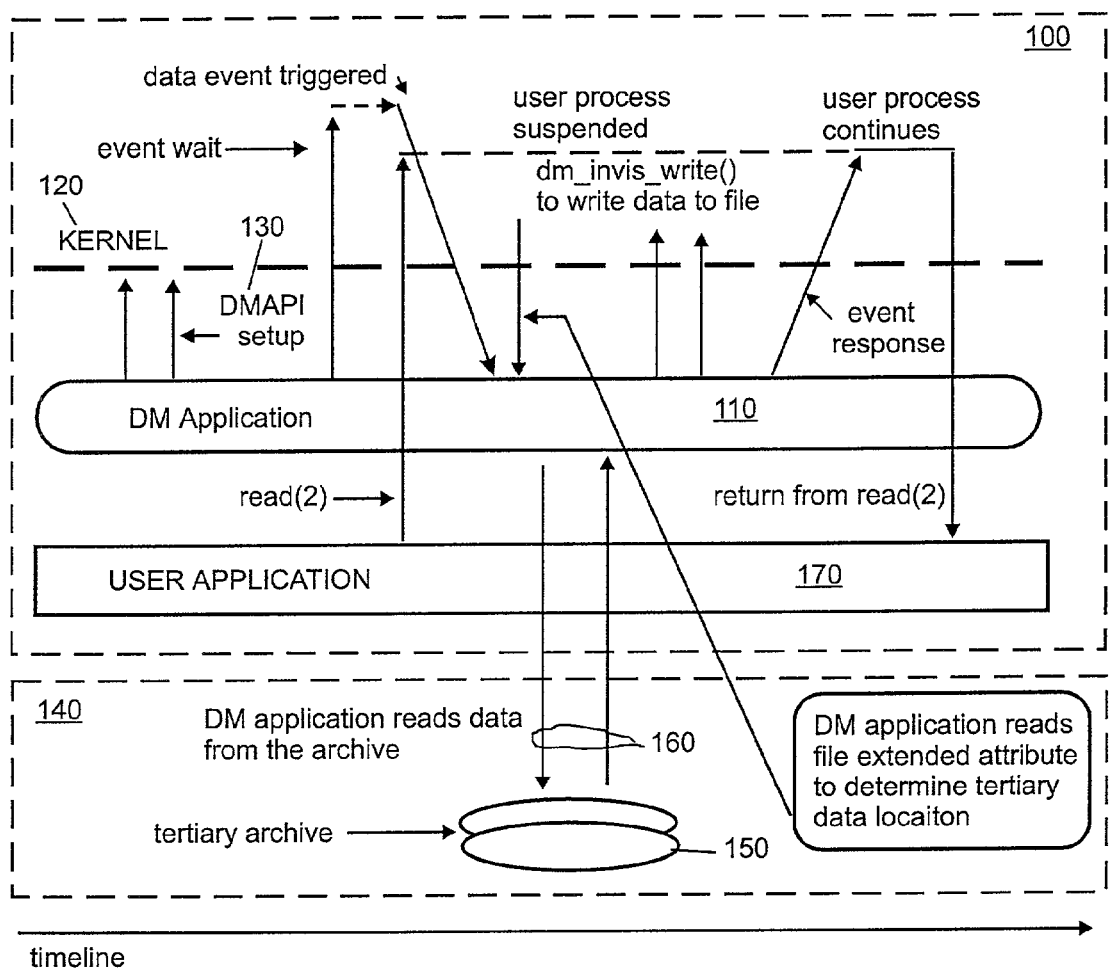
FIG. 1 is a schematic data flow diagram illustrating the DMApi model data flow for reading a non-resident file according to the prior art.

FIG. 1 shows a DMApi model data flow for reading a non-resident file over time ("timeline") according to the prior art. A depicted node 100 in a distributed and clustered computer environment comprises a host computer running a DM application 110 which provides several ways to control user access to file data which are stored locally (not shown here), e.g. on a local disk or secondary storage which can be a magnetic disk connected to the shown node. On the node 100, an operating system kernel 120 with a DMApi implementation 130 is running.

On a remote node 140, a tertiary storage 150 is provided which comprises a storage device with a high storage capacity but a low data access or storage performance, which is used for infrequently accessed data. The tertiary storage 150 is often a robotic tape library or an optical disk autochanger and is often connected to some other host on the network. The process 160 of moving the data between secondary and tertiary storage 150 is often called data migration.

File system data (resident data) are present on the local disk and, possibly, duplicated on the tertiary storage 150. Any local changes to the resident data must invalidate the tertiary copy if any. Non-resident data exists on the tertiary storage 150 only and must be copied to the local disk before users can access it. It should be noted that the DMApi data flow model does not allow access to the data if it is not copied to the local disk first.

In order to transfer the data from the tertiary storage 150 to the file on the local storage, the DM application 110 is able to write to the file while managed regions are set. The DMApi provides special interfaces (not shown here) for accessing the data 'under cover', bypassing event generation code. These interfaces are often called invisible I/O. Their semantics are similar to regular read (2) and write (2) system calls, except they do not generate data events and they do not modify file timestamps.

In order to send file data to the tertiary storage 150, the DM application 110 needs to acquire access rights to the target file. Using the dedicated DMApi calls both the file attributes as well as the file data can be read out and sent to a remote data server. Thereafter data segments can be freed (punching a data hole) in order to gain local storage. The "data hole" is a so-called managed region. The DM access rights are released after this procedure.

In order to receive messages from the filesystem, the DM application 110 needs to define a set of DM events it would like to receive for a given filesystem. Among other things such events can be read/write/truncate access to a file or filesystem state events regarding mounting or storage space (e.g. Out-of-space notification).

If a user application 170 reads a punched file (->its managed regions) the DMApi suspends the application and sends out an event to a message queue. A DM application with the appropiate DM event disposition can read out the event and restore the file data from remote storage. Thereafter the event is responded which reactivates (unblocks) the original application that caused the read event.

HSM implementations such as the Tivoli Space Manager usually manage the local storage space automatically. So if a filesystem exceeds a defined usage rate,—say—70% or generates or out-of-space event a DM daemon starts migrating eligible files based on a generated candidates list to the remote server till a defined lower threshold is reached.

Figure 2:
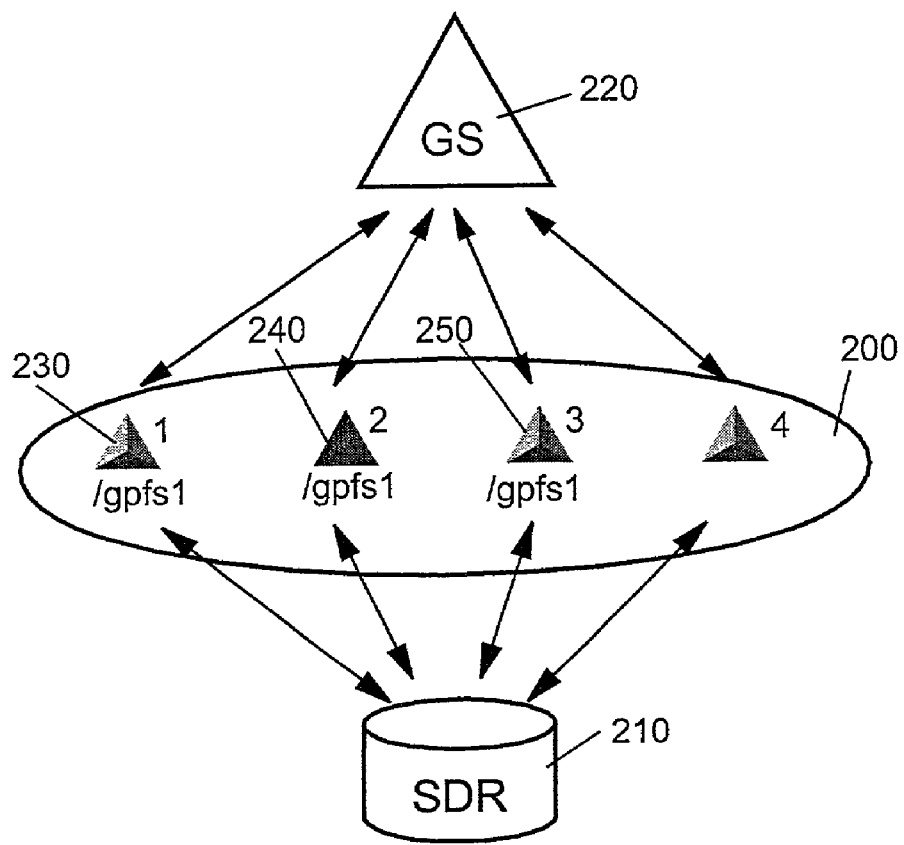
FIG. 2 is a schematic block diagram showing an initial state of a node cluster, in accordance with the invention.

FIG. 2 shows the initial state of a 4-node cluster 200 according to the invention. Node 2 is providing DM services for a specified General Parallel File System (GPFS) called "/gpfs1". The nodes 1 and 3 are potential candidates (failover candidate nodes) to take over the services of node 2. On node 4 the shared filesystem is not implemented and therefore not eligible. The configuration data is stored in an IBM AIX SP-wide "system data repository" (SDR) 210. The communication between the nodes is accomplished via SP Group Services (GS) 220 which tracks node failures and offers a communication protocol to distribute messages within a defined group of nodes (here the nodes participating in the cluster).

A uniform configuration within the cluster 200 is guaranteed by storing the configuration data for all failover nodes 230–250 in the SDR 210 arranged within the cluster 200.

Figure 3:
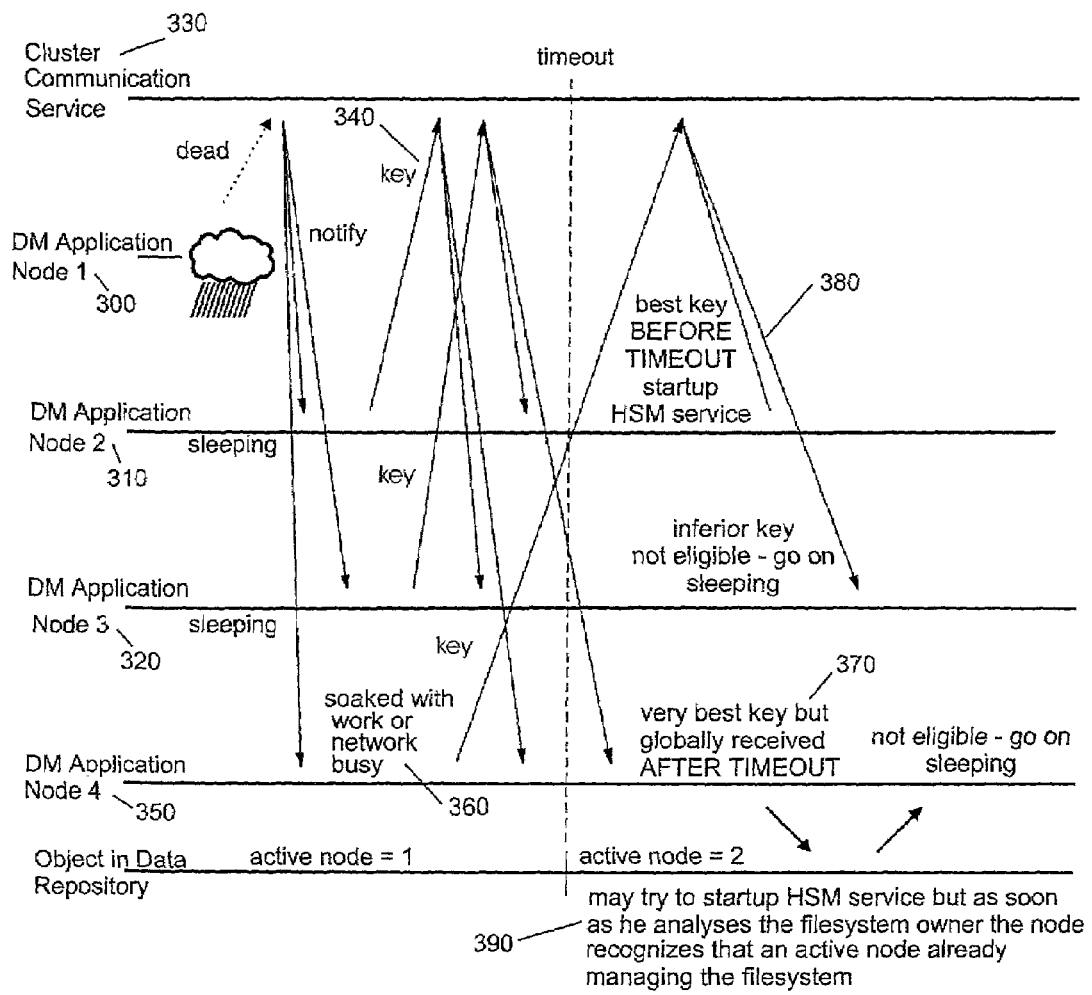
FIG. 3 is a time chart depicting a first embodiment of the invention providing synchronous synchronization between several failover candidate nodes for taking over services of a failure node.

The shared environment needs to know:
list of filesystems managed within the cluster 200 including filesystems specific settings
node currently managing one or more filesystems
additional configuration information like e.g. the access information to a remote storage servers In addition, a communication interface is provided to distribute messages (e.g. a failure report of a node) to the participating nodes of the failover environment (see FIG. 3 for an adequate failure recovery communication protocol).

The communication instance (such as AIX SP Group Services) provides an API which allows participating cluster nodes to form a management group. In the communication architecture each node is a client (a so-called service "providers" in the SP GS world) of the group service instance (server). Client messages send to the interface are automatically distributed to the participating group members. The AIX SP GS message notification is event-driven (->callback function).

If the DM application on a node is no longer able to provide its service, the other members of the failover group must be notified about the failure. This can be done either actively from the failure node or, in case of a total node failure (crash), reported by a cluster communication service (e.g. SP GS).

Based on the failure notification, the potential takeover nodes in the failure environment have to synchronize their efforts to recover the DM services for the filesystems formerly managed by the failure node. Each node needs to analyse the shared configuration data stored in the central data repository 210 in order to decide whether it is eligible to take over the service of the failure node. The result of this procedure can be as follows:

| a) | synchronous or |
| b) | asynchronous |

FIG. 3 shows a first embodiment of the method according to the invention in a 4-node cluster such as depicted in FIG. 2. It provides synchronous i.e. communication-based synchronization between several failover candidate nodes for taking over services of one failure node 300.

In order to provide failover functionality between different nodes of a cluster the DM application needs to be installed on all nodes that should participate in the failure recovery process. In the initial configuration at least one of these nodes provides data management (DM) services for a specific filesystem. Potential failover candidates 310, 320 remain sleeping in the background or provide services for different filesystems.

The eligible nodes 310, 320 send out one message through a cluster communication mechanism handled by a dedicated cluster communication service 330 such as the above described Group Services in order to distribute it to the other members 310, 320, 350 of the group. This message includes a priority key 340 (e.g. based on the workload 360 of the node).

The method preferably provides a blocking mechanism which is based on a command interface provided by the System Data Repository (SDR) used in AIX SP. The SDR allows to create and modify persistent data objects for a given data record type. It is possible to check and modify a data object in an atomic operation thus setting a lock (similar to a system mutex) on a shared HSM resource which, in the present embodiment, is implemented as the following IF-THEN conditional step If (lock==0) then {lock=1}

If this check fails, the caller waits for a while before trying again. Additional to the lock a succeeding node also needs to update a lock specific timestamp (based on the cluster-wide synchronized clock). If a node holding the lock crashes the waiting node would try accessing the lock forever which is obviously not desirable.

A service takeover may take as long as about 60 seconds. Now if the timestamp for a lock is older than these 60 seconds a candidate node can assume that the node holding the lock will not recover and is free to force the takeover of the lock (updating the timestamp again). After the access of 1. No candidate: nothing to do - the service cannot be recovered
2. one candidate: service can be recovered without additional synchronization efforts
3. more than one candidate: service can be recovered but a synchronization is required Regarding result option 3., if the cluster 200 of nodes does not communicate via shared memory (e.g. a cluster of independent machines such as an IBM SP) it takes extra efforts to synchronize the different nodes. The synchronization between several candidates for taking over the filesystems of a failure node can be done either the shared HSM resource is complete, the lock is reset to zero.

The priority key as described above is based on the UNIX "uptime" command. Besides other data "uptime" reports the system workload over the last 15 min. The higher the reported workload the lower the value of the priority key.

The nodes receiving a message can match the incoming key with the own one. The best key 380 wins the right to take over the service. The number of potential backup nodes sending out a key is unknown in the system so the voting phase needs to finish after a certain timeout 370.

The winning node either adds one or more filesystems to his currently active HSM configuration or starts up HSM service 380. Typical for DMApi based applications it needs to set the event mask to takeover all incoming events generated for the target filesystem(s). The node taking over a service needs to update the configuration files within the central data repository to insure consistency. The update mechanism must be by the locking mechanism (see above) in order to avoid race conditions. The rest remains either a sleeping backup or continues the service on their own HSM filesystems. If a node is delayed in the voting phase it can match the active node defined in the owner file with the failed node. If there's a mismatch it drops the attempt to get in control because takeover has already happened.

Handling the situation by a synchronous multi-phase handshake mechanism as described above requires to keep status information for some time plus quite a bit of communication overhead is involved. It is also necessary to vote per filesystem because the initial takeover node may not be able to manage all filesystems of the failure node (e.g. filesystem not mounted).

Figure 4:
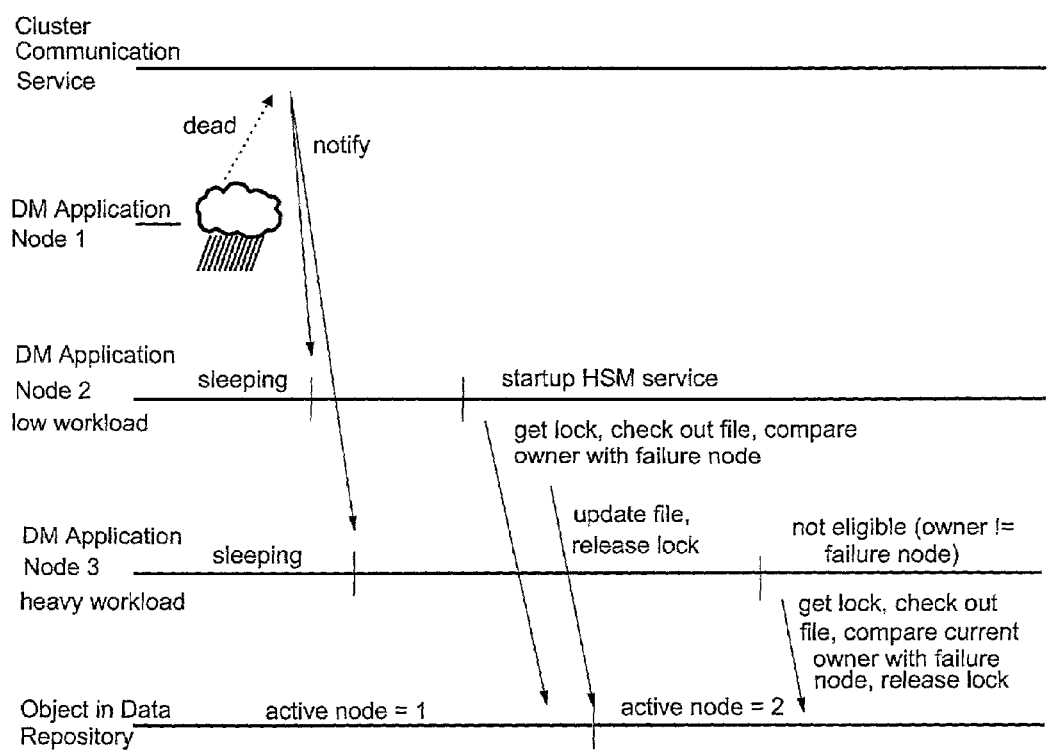
FIG. 4 is a time chart similar to FIG. 3 depicting an embodiment which provides asynchronous synchronization.

FIG. 4 shows a different embodiment where synchronization between failover candidate nodes is accomplished via an asynchronous (data lock based) protocol. That embodiment is illustrated in a situation with 3 nodes. Each node can compete to takeover a filesystem simply by locking, updating and unlocking the configuration files. The node that was able to lock and modify the configuration files in the cluster data repository wins the right to takeover filesystems from the failure node. The failover request will cascade further to delayed nodes which may still be able to takeover remaining filesystems that cannot be serviced by previous takeover nodes. In contrast to the synchronous approach depicted in FIG. 3, the predescribed asynchronous failover mechanism does not require explicit messages between the nodes of the failover group.

At the time of failure the failing node can be processing data management (DM) events from the filesystem. Processes generating such events are blocked by the DMApi environment till the DM Application releases the event after the data of a file is recalled from a remote storage server. The node taking over the service uses an existing or—if none exists—creates a new DMApi session. In addition, it assumes the session from the failed node. Pending events from the failed node are moved to a temporary DMapi session and are managed in different ways, depending on the kind of event. This insures that blocked processes are released again.

Figure 5:
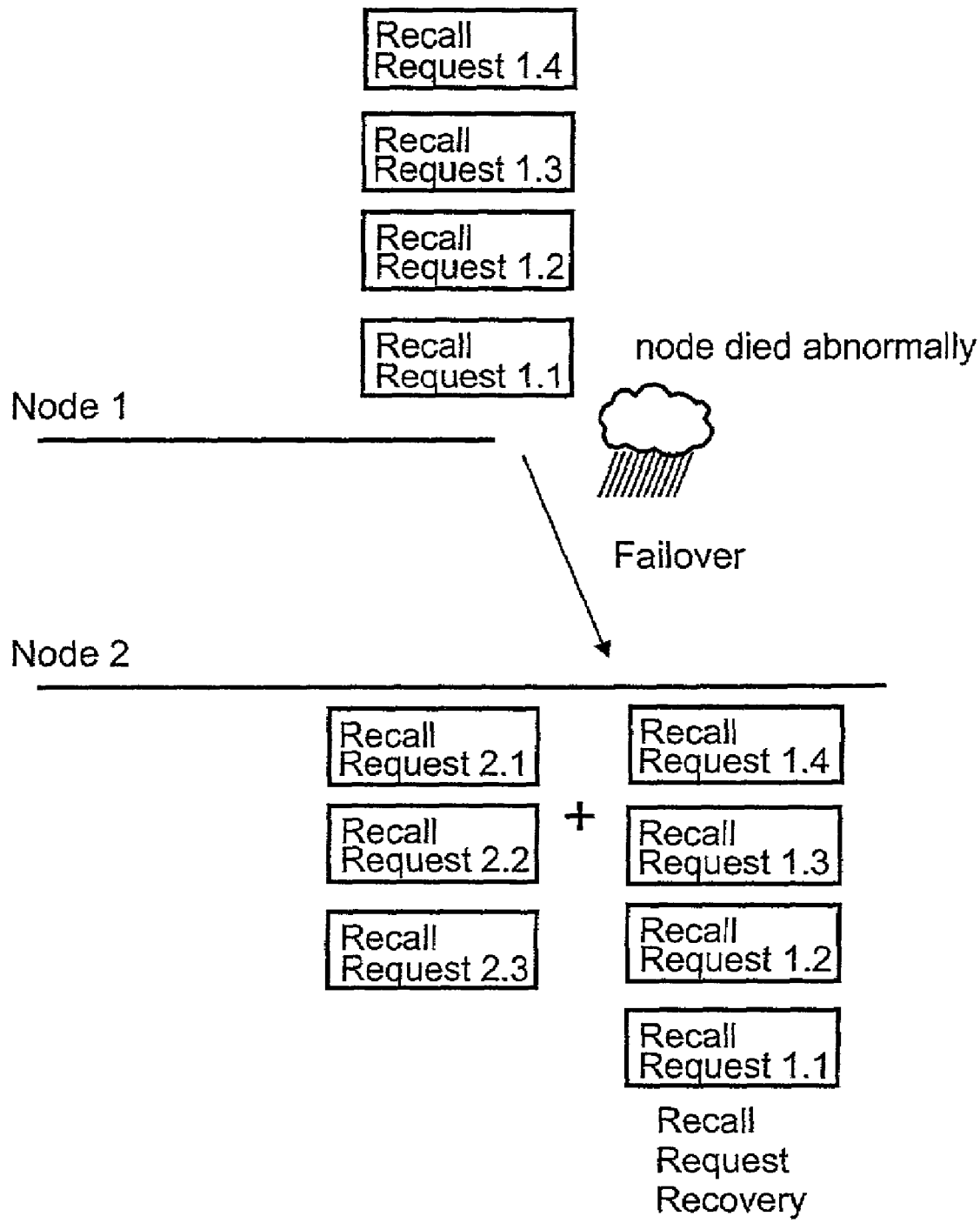
FIG. 5 is a block diagram illustrating takeover of a remote data recall request according to the invention.

The illustration depicted in FIG. 5 shows the takeover of remote data recall requests. On GPFS HSM the DMApi supports this kind of event takeover if the GPFS daemon died (abnormally, due to a node crash, by user request).

Depending on the kind of communication event handling the DM application may also need a sort of queuing to avoid problems with concurrent threads. In principal all processes/threads get blocked by a locked data object in the central data repository but this invokes busy waiting which is not desirable. In a single threaded environment incoming requests could be stored in a simple FIFO list. In a multi-threaded environment the synchronization could be achieved by system mutexes or condition variables.

Figure 6:
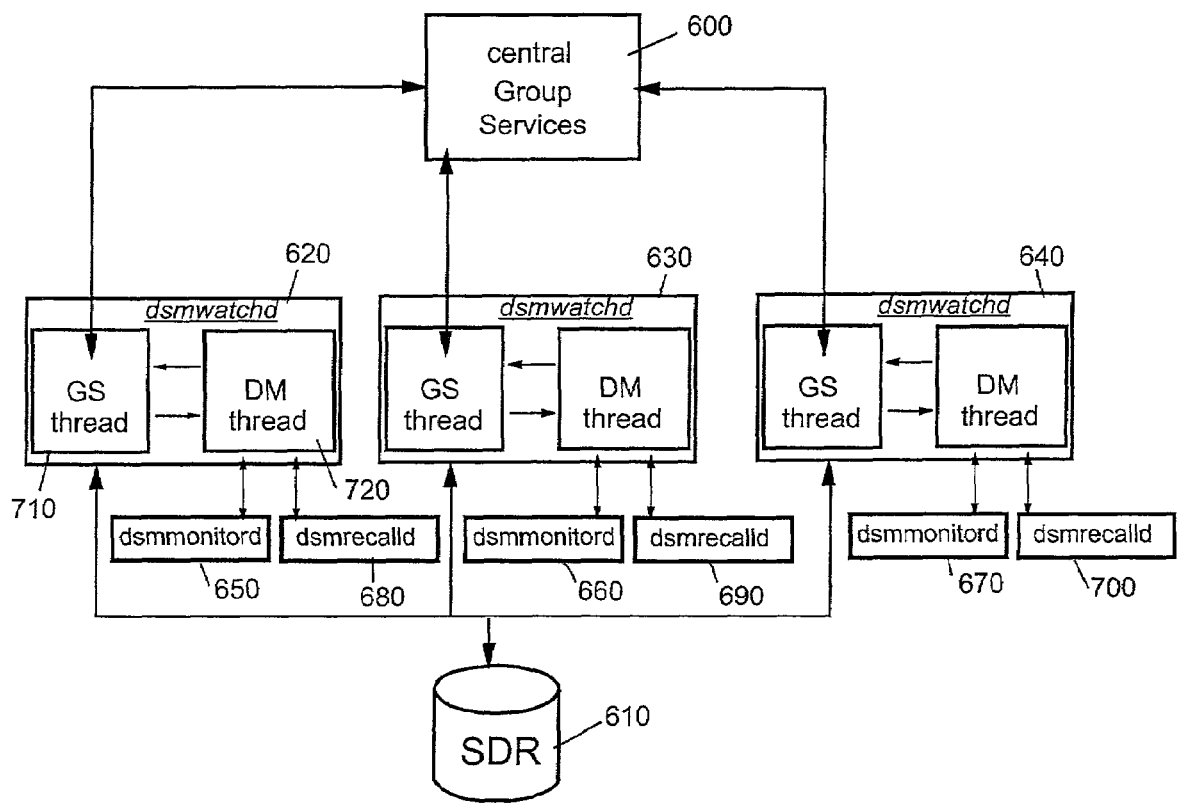
FIG. 6 is another block diagram depicting an exemplary implementation of the invention.

Finally, FIG. 6 depicts a group services implementation of the invention in a GPFS HSM for AIX on IBM SP.

The shown SP environment features

Group Services (GS) 600 which provides a cluster-wide communication protocol plus a tracking mechanism for node crashes System Data Repository (SDR) 610 to store cluster-wide configuration files.

The SP Group Services provides a mechanism to form a communication group consisting of processes running distributed on any SP node. The participating processes can distribute messages to all the members of the group. Additionally Group Service can be instructed to monitor the life status of the member processes—a feature which can be used to report process (->total node) failures to the group members triggering the failover mechanism.

The tasks of GPFS HSM on AIX SP are divided into 3 daemons:

dsmwatchd 620, 630, 640, which is the focal point for all failover/recovery activities dsmrecalld 680, 690, 700 responsible to recall migrated data back from the remote storage server dsmmonitord 650, 660, 670 takes care of out-of-space-condition of a filesystem and automatic data migration to the remote storage server The dsmwatchd fulfils basically two tasks:

recovery of a crashed dsmmonitord and dsmrecalld performed by the main process (DM thread) 720 managing the failover environment triggered by GS callback threads 730 including active failover in case of a corrupted local environment (GPFS daemon crash/shutdown, node crash, HSM daemon corrupted)

active takeover of filesystems of a remote failure node.

According to the first task 1., the dsmwatchd "pings" the dsmrecalld via a DM call in order to check that DM services are up and to insure that the dsmrecalld is actually running.

If the dsmwatchd can no longer ping the dsmrecalld it will try to restart the dsmrecalld once and if this does not succeed it will initiate failover to a different node based on the assumption that the DM environment is corrupted. Additionally it tracks the process ID in order to restart the target daemon if the PID is no longer present.

According to the second task 2., the SP Group Services (GS) operations are implemented as described above. The takeover mechanism preferably works asynchronously since a synchronous operation often cannot take place due to certain GS limitations. Multiple failover requests are queued via pthread mutexes.

What is claimed is:

1. A method for handling failover of a data management application for a shared disk file system in a distributed computing environment having a cluster of loosely coupled nodes which provide services, comprising the steps of:

defining certain nodes of the cluster as failover candidate nodes;

storing configuration information for all the failover candidate nodes;

distributing message information including but not limited to failure information of at least one failover candidate node among the failover candidate nodes;

analyzing the distributed message information and the stored configuration information in order to determine whether to take over the service of a failure node by a failover candidate node or not;

in a first failover candidate node, taking over only a subset of the file system from the failure node;

carrying over a remaining portion of the file system not taken over by the first failover candidate node to at least a second failover candidate node; and updating the configuration information in case of the first failover candidate node and at least the second failover candidate node taking over the service of a failure node.

2. The method according to claim 1, wherein the configuration information is stored in a central data storage arranged within the cluster.

3. The method according to claim 1, wherein the distributed message information includes a failure report of at least one node.

4. The method according to claim 1, wherein the failover candidate nodes calculate a priority key related to the workload of each of the failover candidate nodes which is distributed as part of the distributed message information.

5. The method according to claim 4, wherein the failover candidate nodes receiving the priority key compare the received priority key with their own priority key whereby the best priority key wins the right to take over the service.

6. The method according to claim 1, wherein the updating of the configuration information is handled by means of a locking mechanism.

7. An article of manufacture comprising a computer usable medium having computer readable program code means embodied therein for causing handling of failover of a data management application for a shared disk file system in a distributed computing environment having a cluster of loosely coupled nodes which provide services, the computer readable program code means in the article of manufacture comprising computer readable program code means for causing a computer to effect:

defining certain nodes of the cluster as failover candidate nodes;

storing configuration information for all the failover candidate nodes;

distributing message information including but not limited to failure information of at least one failover candidate node among the failover candidate nodes;

analyzing the distributed message information and the stored configuration information in order to determine whether to take over the service of a failure node by a failover candidate node or not;

in a first failover candidate node, taking over only a subset of the file system from the failure node;

carrying over a remaining portion of the file system not taken over by the first failover candidate node to at least a second failover candidate node; and updating the configuration information in case of the first failover candidate node and at least the second failover candidate node taking over the service of a the failure node.

8. A system for handling failover of a data management application for a shared disk file system in a distributed computing environment having a cluster of loosely coupled nodes which provide services, comprising data storage means for storing configuration information for failover candidate nodes;

communication interface means for distributing message information between the failover candidate nodes;

means for analyzing the message information and the configuration information in order to determine whether to take over the service of a failure node by a failover candidate node or not;

means for cascading the failover handling whereby a failover request is carried on to at least a second failover candidate node if only a subset of the file system is taken over from the failure node by a first failover candidate node; and means for updating the configuration information in case of the first failover candidate node and at least a second failover candidate node taking over the service of a failure node.

9. The system according to claim 8, where the data storage means is a central data storage arranged within the cluster.

10. The system according to claim 8, where the means for updating the configuration information are located at least at one of the first failover candidate node and the at least second failover candidate node taking over a service of the failure node.

* * * * *